May 19, 1959  G. W. JACKSON  2,887,324
FLUID SUSPENSION CONTROL MECHANISM
Filed Sept. 28, 1955
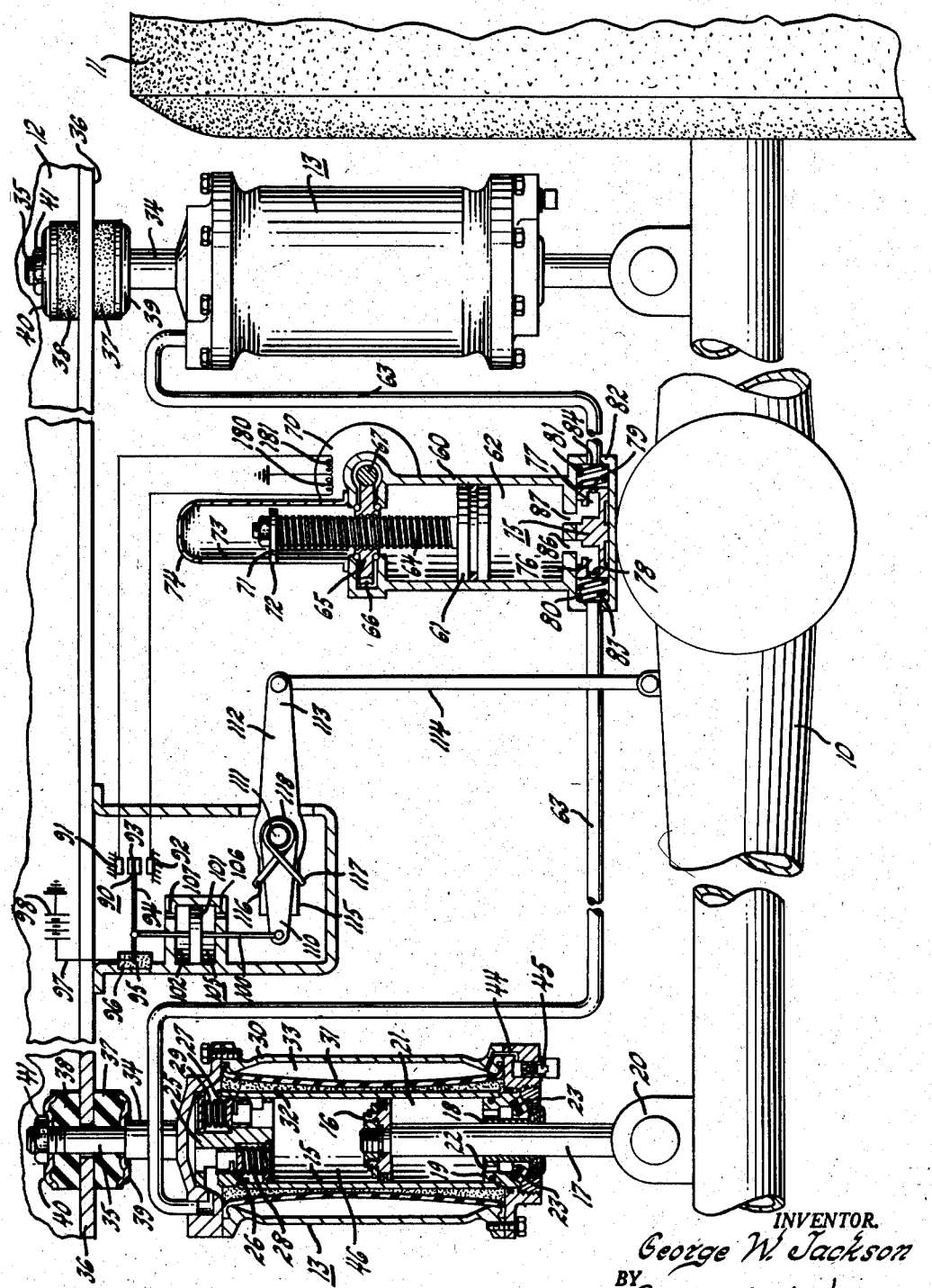
INVENTOR.
George W. Jackson
BY
Craig V. Morton
HIS ATTORNEY United States Patent Office 2,887,324
Patented May 19, 1959

2,887,324

FLUID SUSPENSION CONTROL MECHANISM

George W. Jackson, Dayton, Ohio, assignor to General Motors Corporation, Detroit, Mich., a corporation of Delaware Application September 28, 1955, Serial No. 537,121

7 Claims. (Cl. 280—124)

This invention relates to apparatus for establishing and maintaining a relatively constant static clearance height between the sprung mass and the unsprung mass of a vehicle, and particularly relates to control apparatus that responds to a change in clearance height between the sprung mass and the unsprung mass to reestablish the predetermined clearance height.

The invention is particularly adapted for use in connection with a vehicle suspension system in which fluids are used to provide the resilient means for supporting the sprung mass, that is the vehicle body, upon the unsprung mass, that is the running gear and axle. The suspension means may be in the form of a device adapted to receive fluid under pressure and have fluid exhausted therefrom to support the body of the vehicle at a predetermined height above the axle. Apparatus particularly adapted for such use comprises a hydro-pneumatic suspension unit containing a predetermined volume of liquid supported by a predetermined gaseous pressure medium, one of which devices is disclosed in my copending application for patent S.N. 500,444, filed April 11, 1955, now Patent No. 2,850,276, granted September 2, 1958, for a Hydro-Pneumatic Suspension Unit, which device includes a cylinder and piston arrangement disposed within a housing structure that forms a liquid reservoir for receiving hydraulic liquid from the cylinder and supplying liquid to the cylinder as the piston reciprocates within the cylinder, the reservoir chamber having a tubular expansible wall dividing the reservoir chamber into two compartments one of which contains a gaseous medium under pressure and the other forming the reservoir for interchange of hydraulic fluid with the cylinder.

It is well known that passenger vehicles are subject to wide variations in passenger load so that suspension units are compressed to a greater extent on a heavy passenger load than when the vehicle carries a light passenger load, or when the suspension units are merely required to support the body on the axle. Thus to maintain a predetermined clearance height between the body and the axle of the vehicle it becomes necessary to increase the internal pressure conditions within the hydro-pneumatic suspension unit to sustain the heavier loads at the predetermined clearance height.

It is an object of this invention to provide a control mechanism for regulating the supply of fluid delivered to and exhausted from the suspension unit in response to a change in load conditions in the sprung mass to maintain a substantially constant static clearance height between the sprung mass and the unsprung mass of the vehicle, and to utilize the change in clearance height effected by the change in load conditions of the sprung mass to render the control apparatus effective to reestablish the predetermined clearance height of the sprung mass relative to the unsprung mass.

Further objects and advantages of the present invention will be apparent from the following description, reference being had to the accompanying drawings wherein a preferred form of the invention is clearly shown.

In the single figure of the drawing there is illustrated a suspension system for a vehicle including a control for maintaining a predetermined clearance height between the sprung mass and the unsprung mass of the vehicle.

In the drawing there is illustrated an axle 10 having a wheel 11. The axle and the wheel forms the unsprung mass of the vehicle.

Supported upon the axle 10 there is the chassis frame 12 that is resiliently supported on the axle 10 by means of the resilient suspension devices 13, one of which is illustrated in cross section. The resilient suspension devices 13 are like that disclosed in my copending application S.N. 500,444, filed April 11, 1955, referred to above, in which application the suspension device is more fully disclosed and described.

Generally speaking however the suspension device 13 comprises a cylinder 15 in which there is slidably disposed the piston 16. The piston 16 has a rod 17 that extends from one end of the cylinder 15 through a rod guide 18 carried in the closure member 19 for the cylinder 15. The rod 17 is connected to the axle 10 by means of a fitting 20.

The cylinder chamber 21 below the piston 16 is open to atmosphere through the ports 22 and the porous filters 23.

The opposite end of the cylinder 15 has a closure member 25 that contains the liquid flow control valves 26 and 27. The valves 26 and 27 are maintained in the positions illustrated by means of the springs 28 and 29 respectively, both valves being illustrated in a closed position.

The cylinder 15 is positioned within an enclosed housing 30 that forms a liquid reservoir. The housing 30 has a flexible tubular expansible wall 31 that extends from one end to the other of the housing and separates the housing into two compartments, 32 and 33. The compartment 33 is a closed compartment one wall of which is formed by the expansible wall 31. The compartment 32 contains hydraulic fluid that is adapted for transfer between the interior of the cylinder 15 and the reservoir 32 through the valves 26 and 27.

The housing 30 supports a pin 34 that has a reduced diameter portion 35 extending through the flange 36 of the chassis frame 12. The reduced diameter portion 35 is secured to the chassis frame 12 by means of the rubber bushings 37 and 38, the bushings being compressed between the disks 39 and 40 when the nut 41 is tightened upon the stem portion 35.

The resilient suspension device 13 has the chamber 33 filled with a gaseous medium under pressure through a passage 44 controlled by the valve 45. The upper chamber 46 of the cylinder 15 and the reservoir compartment 32 of the housing 30 is filled with hydraulic liquid. Thus when the resilient suspension device 13 is placed between the chassis frame 12 and the axle 10 the upward movement of the piston 16 places the hydraulic liquid in the cylinder chamber 46 and the reservoir 32 under pressure which is balanced by the gaseous pressure in the compartment 33 whereby to position the chassis frame 12 at a predetermined height clearance relative to the axle 10, as illustrated in the drawings.

The valves 26 and 27 permit interchange of hydraulic liquid between the cylinder chamber 46 and the reservoir 32 to absorb the shock of axle movement 10, the valve 27 allowing fluid to flow from the cylinder chamber 46 into the reservoir 32 upon upward movement of the piston 16 in the cylinder 15 while the valve 26 allows fluid to flow from the reservoir into the cylinder chamber on downward movement of the piston 16 relative to the cylinder 15.

It will thus be seen that the hydro-pneumatic suspension unit 13 normally provides for establishing a predetermined static clearance height between the chassis frame 12 and the axle 10. However, when the load increases in the vehicle body carried on the chassis frame 12 the frame 12 will tend to move toward the axle 10, the greater load causing displacement of liquid from the cylinder chamber 46 into the reservoir 42 to increase compression of the gaseous medium 33. This allows the static clearance height between the chassis frame 12 and the axle 10 to become less than the normal preestablished clearance height.

To reestablish the predetermined and normal static clearance height between the chassis frame 12 and the axle 10, liquid under pressure may be supplied to the reservoir 32 in volume sufficient to compress the gaseous medium in compartment 33 sufficiently to counterbalance the increase load effect of the chassis frame 12 on the suspension unit 13 and thereby return the chassis frame to a predetermined clearance height relative to the axle 10. Upon release of load from the chassis frame 12, subsequent to an increase in load, the liquid previously supplied to the reservoir 32 may be removed to allow the chassis frame to settle to the predetermined clearance height.

Apparatus and control mechanism accomplishing the foregoing result comprises a cylinder 60 having a piston 61 reciprocable therein and forming with the cylinder 60 a reservoir chamber 62 that is connected with the reservoir compartment 32 of the housing 30 by means of a conduit 63.

The piston 61 is carried on the forward end of a screw 64 threadedly received in a nut 65 that has its exterior periphery arranged in the form of a worm wheel 66 engaging a worm 67 that is driven by a reversible electric motor 70. The screw 64 has a washer 71 on the upper end thereof provided with a projection 72 that enters a slot 73 in a cover member 74 to prevent rotation of the screw 65 when the worm wheel 66 is rotated by the worm 67. Rotation of the worm wheel 66 effects reciprocable movement of the piston 61 in the cylinder 60 upwardly or downwardly depending upon the direction of rotation of the electric motor 70.

The suspension devices 13 are both connected with the reservoir chamber 62 of the cylinder 60 through a flow equalizing valve 75. The valve 75 has chambers 76 and 77 receiving fluid from the reservoir chamber 62 with the liquid passing from the chambers 76 and 77 through the flow restriction orifices 78 and 79 into the chambers 80 and 81 of the valve housing 82 in which there are located the compression springs 83 and 84 that normally centralize the valve 75 relative to the discharge ports 86 and 87 from the reservoir chamber 62.

Pressure drop across the orifices 78 and 79 causes movement of the valve 75 in one direction or the other depending upon the flow rate through the orifices to maintain a balance between the liquid flow to both of the suspension devices 13 to supply the same with equivalent volumes of fluid and exhaust of equivalent volumes of fluid from the device.

It will be apparent that upon downward movement of the piston 61 fluid will be displaced from the reservoir chamber 62 into the reservoir chambers 32 and upon upward movement of the piston reverse flow is occasioned.

The upward and downward movement of the piston 61 is effected by the electric motor 70 having the windings 180 and 181 that provide for rotation of the motor 70, and thus the worm 67, in either direction depending upon the energization of the respective windings. The windings 180 and 181 are connected with a control switch 90 that comprises the stationary contacts 91 and 92 and the movable contact 93. The movable contact 93 is carried on the end of an arm 94 pivoted at 95 on the electrical insulating block 96. The arm 93 is connected by the wire 97 to a battery 98.

The arm 94 of the switch 90 has a rod 100 extending therefrom on which there is located the piston 101 reciprocable in the cylinder 102 to form a dash-pot 105. Restriction orifices 106 and 107 are provided in the cylinder 102 on opposite sides of the piston 101 to effect restricted flow of air into and out of the cylinder chambers on opposite sides of the piston 101 and thereby restrict the movement of the piston in the cylinder to obtain a damping of movement of the rod 100 that is connected on one end of the lever 110 pivotally supported on the shaft 111.

The shaft 111 also carries the lever 112 pivoted on the shaft 111 with the end 113 connected with the axle 10 through means of the link 114. The opposite end 115 of the lever 112 is connected with the lever 110 by means of opposite ends 116 and 117 of a torsion spring 118 carried on the shaft 111.

Movement of the axle 10 caused by road roughness, resulting in reciprocation of the link 114 and the lever 112 will not effect operation of the control switch 90 since the dash-pot 105 dampens movement of the rod 100, the end 115 of the lever 112 merely working against the opposite ends 116 and 117 of the torsion spring 118.

However, upon prolonged displacement of the chassis frame 12 relative to the axle 10 from the predetermined position shown in the drawing, the link 114 will move upwardly, or downwardly, and displace the piston 101 in one direction or the other to effect movement of the control switch 90 for placing the movable contact 93 into engagement with either of the stationary contacts 91 or 92 and thereby result in operation of the electric motor 70.

For example, when the load increases in the vehicle body and the chassis frame 12 moves downwardly as a result thereof toward the axle 10, the rod 114 will move upwardly and thereby displace the piston 101 downwardly to cause the control switch 90 to move the movable contact 93 into engagement with the stationary contact 92. This operation results in rotation of the electric motor in a direction to effect movement of the piston 61 in the cylinder 60 downwardly. As a result liquid is displaced from the reservoir chamber 62 through the flow equalizing valve 75 into the reservoir chambers 32 of the suspension devices 13. The additional liquid supplied into the reservoir 32 causes the piston 16 within the cylinder 15 to be moved downwardly and thereby displace the chassis frame 12 relative to the axle 10 until the contact 93 of switch 90 opens circuit to the electric motor 70, at which time the chassis frame 12 will have been returned to its predetermined clearance height relative to the axle 10.

When load in the vehicle body lightens, subsequent to a loaded condition, a reverse operation will take place and liquid will be allowed to be displaced from the suspension devices 13 back into the fluid reservoir 62 when the piston 61 is moved upwardly by the reverse direction of the motor 70.

While the form of embodiment of the invention as herein disclosed constitutes a preferred form, it is to be understood that other forms might be adopted as may come within the scope of the claims which follow.

What is claimed is as follows:

1. Apparatus for establishing and maintaining a relatively constant static clearance height between the sprung mass and the unsprung mass of a vehicle, including in the combination, an unsprung mass comprising an axle, a sprung mass comprising a vehicle frame, resiliently acting spring suspension means supporting the sprung mass on the unsprung mass comprising wall means forming a chamber having a cylinder therein provided with a piston reciprocable in the cylinder and having a rod extending from the cylinder and the chamber means wherewith to connect said spring suspension means between the sprung mass and the unsprung mass and with the cylinder provided with valve means controlling flow of hydraulic fluid between the cylinder and the chamber and the chamber having a tubular expansible wall between the cylinder and the chamber wall dividing the chamber into two compartments one of which contains hydraulic fluid for interchange with hydraulic fluid in the cylinder and the other of which contains a gaseous medium under pressure, the said spring suspension means normally effecting a predetermined clearance height between the sprung mass and the unsprung mass with a predetermined volume of liquid in the said one chamber and cylinder, a closed liquid system of fixed volume including a reservoir connected with said one chamber, and means in the said system to effect transfer of liquid in either direction between the said reservoir and the said one chamber in response to load changes of the sprung mass.

2. Apparatus for establishing and maintaining a relatively constant static clearance height between the sprung mass and the unsprung mass of a vehicle, including in the combination, an unsprung mass comprising an axle, a sprung mass comprising a vehicle frame, resiliently acting spring suspension means supporting the sprung mass on the unsprung mass comprising wall means forming a chamber having a cylinder therein provided with a piston reciprocable in the cylinder and having a rod extending from the cylinder and the chamber means wherewith to connect said spring suspension means between the sprung mass and the unsprung mass and with the cylinder provided with valve means controlling flow of hydraulic fluid between the cylinder and the chamber and the chamber having a tubular expansible wall between the cylinder and the chamber wall dividing the chamber into two compartments one of which contains hydraulic fluid for interchange with hydraulic fluid in the cylinder and the other of which contains a gaseous medium under pressure, the said spring suspension means normally effecting a predetermined clearance height between the sprung mass and the unsprung mass with a predetermined volume of liquid in the said one chamber and cylinder, a closed liquid system of fixed volume including a cylinder connected with said one chamber and forming a reservoir, piston means in the said cylinder to effect transfer of liquid in either direction between the said cylinder and the said one chamber, and actuating means responsive to load changes of the sprung mass operatively connected with said piston to effect axial movement of the piston in the cylinder to effect the said transfer of liquid in proportion to load change of the sprung mass.

3. Apparatus in accordance with claim 2 in which the said spring suspension means comprises plural individually operating resiliently acting spring suspension devices and in which the apparatus includes equalizing liquid flow valve means between the said cylinder and the said one chamber of each of said spring suspension devices to effect equal volume liquid flow to each of the suspension devices concurrently.

4. Apparatus for establishing and maintaining a relatively constant static clearance height between the sprung mass and the unsprung mass of a vehicle, including in the combination, an unsprung mass comprising an axle, a sprung mass comprising a vehicle frame, plural individually operating resiliently acting spring suspension means supporting the sprung mass on the unsprung mass and each including a liquid pressure receiving chamber means coacting therewith to effect a predetermined clearance height between the sprung mass and the unsprung mass with a predetermined volume of liquid in the said receiving chamber means, a closed liquid system including said pressure receiving means and reservoir chamber means in fluid intercommunication and filled completely by liquid of a constant volume, means in the said system to effect transfer of liquid between the said reservoir and the said receiving means in response to load changes of the sprung mass without changing constancy of said volume, and equalizing liquid flow valve means between the said reservoir means and the said plural spring suspension means to effect equal volume liquid flow to each of said suspension means.

5. Apparatus for establishing and maintaining a relatively constant static clearance height between the sprung mass and the unsprung mass of the vehicle, including in the combination, an unsprung mass comprising an axle, a sprung mass comprising a vehicle frame, resiliently acting spring suspension means supporting the sprung mass on the unsprung mass including liquid pressure receiving chamber means having a movable wall separating the said chamber means from a gaseous pressure chamber and coacting therewith to effect a predetermined clearance height between the sprung mass and the unsprung mass with a predetermined volume of liquid in the said pressure receiving chamber means, a closed liquid system including said liquid pressure receiving chamber means and a cylinder forming therewith a fluid system of fixed volume filled completely with liquid, and piston means in the said cylinder to provide for transfer of liquid between the said cylinder and the said liquid pressure receiving chamber means in either direction of flow by movement of the piston in the cylinder.

6. Apparatus for establishing and maintaining a relatively constant static clearance height between the sprung mass and the unsprung mass of the vehicle, including in the combination, an unsprung mass comprising an axle, a sprung mass comprising a vehicle frame, resiliently acting spring suspension means supporting the sprung mass on the unsprung mass including liquid pressure receiving chamber means having a movable wall separating the said chamber means from a gaseous pressure chamber and coacting therewith to effect a predetermined clearance height between the sprung mass and the unsprung mass with a predetermined volume of liquid in the said pressure receiving chamber means, a closed liquid system including said liquid pressure receiving chamber means and a cylinder forming a reservoir in fluid intercommunication and filled completely by liquid of a constant volume, and piston means in the said cylinder to effect transfer of liquid between the said cylinder reservoir and the said liquid pressure receiving chamber means on movement of the piston in the cylinder, actuating means responsive to load variations of the sprung mass operatively connected with said piston to effect axial movement of the piston in the cylinder to effect said transfer of liquid in proportion to load change of the sprung mass.

7. Apparatus for establishing and maintaining a relatively constant static clearance height between the sprung mass and the unsprung mass of the vehicle, including in the combination, an unsprung mass comprising an axle, a sprung mass comprising a vehicle frame, resiliently acting spring suspension means supporting the sprung mass on the unsprung mass including liquid pressure receiving chamber means having a movable wall separating the said chamber means from a gaseous pressure chamber and coacting therewith to effect a predetermined clearance height between the sprung mass and the unsprung mass with a predetermined volume of liquid in the said pressure receiving chamber means, a closed liquid filled system consisting of said liquid pressure receiving chamber means and a liquid displacement chamber means in continuous free fluid intercommunication and filled completely by a fixed volume of liquid, and means in the said system to effect transfer of liquid between the said liquid displacement chamber means and the said receiving chamber means in either direction of flow in response to load changes of the sprung mass to correct said clearance height while maintaining constancy of said liquid volume.

References Cited in the file of this patent

UNITED STATES PATENTS

| | | |
|---|---|---|
| 1,291,016 | Kellogg | Jan. 14, 1919 |
| 1,301,474 | Martens | Apr. 22, 1919 |
| 1,700,044 | Hales | Jan. 22, 1929 |
| 2,074,609 | Hooper | Mar. 23, 1937 |
| 2,620,182 | Marston et al. | Dec. 2, 1952 |
| 2,698,751 | Nye et al. | Jan. 4, 1955 |
| 2,757,376 | Brueder | July 31, 1956 |

FOREIGN PATENTS

| | | |
|---|---|---|
| 953,409 | France | May 23, 1949 |
| 1,076,192 | France | Apr. 21, 1954 |
| 1,089,112 | France | Sept. 22, 1954 |